United States Patent
Hemmer et al.

(10) Patent No.: US 10,692,248 B2
(45) Date of Patent: Jun. 23, 2020

(54) INCREASED DENSITY OF BATCHES FOR IMPROVED PROGRESSIVE MESH COMPRESSION

(71) Applicant: Google LLC, Mountain View, CA (US)

(72) Inventors: Michael Hemmer, San Francisco, CA (US); Pierre Alliez, Sophia-Antipolis (FR); Cedric Portaneri, Sophia-Antipolis (FR)

(73) Assignee: GOOGLE LLC, Mountain View, CA (US)

( * ) Notice: Subject to any disclaimer, the term of this patent is extended or adjusted under 35 U.S.C. 154(b) by 90 days.

(21) Appl. No.: 15/951,963

(22) Filed: Apr. 12, 2018

(65) Prior Publication Data

US 2019/0318507 A1    Oct. 17, 2019

(51) Int. Cl.
  *G06T 9/00* (2006.01)
  *G06T 17/20* (2006.01)
  *H04N 19/91* (2014.01)

(52) U.S. Cl.
  CPC .............. *G06T 9/001* (2013.01); *G06T 17/20* (2013.01); *H04N 19/91* (2014.11)

(58) Field of Classification Search
  CPC ....... G06T 3/4092; G06T 9/001; G06T 17/20; G06T 17/205; H04N 19/20; H04N 19/39; H04N 19/40; H04N 19/91; H04N 19/54
  See application file for complete search history.

(56) References Cited

U.S. PATENT DOCUMENTS

| 5,929,860 A | * | 7/1999 | Hoppe | G06T 17/20 345/419 |
| 6,137,492 A | * | 10/2000 | Hoppe | G06T 17/20 345/418 |
| 6,614,428 B1 | | 9/2003 | Lengyel et al. | |
| 2017/0046874 A1 | | 2/2017 | Mason | |

FOREIGN PATENT DOCUMENTS

WO    9939308 A1    8/1999

OTHER PUBLICATIONS

Maglo et al., "POMAR: Compression of progressive oriented meshes accessible randomly" (Year: 2013).*

(Continued)

*Primary Examiner* — Kenny A Cese
(74) *Attorney, Agent, or Firm* — Brake Hughes Bellermann LLP

(57) ABSTRACT

An encoder includes a processor and a memory. The encoder may perform a method of progressive compression. In one example implementation, the method may include determining priority values associated with collapse of each edge of a plurality of edges. The method may further include selecting a first edge from the plurality of edges, determining adjusted priority values of edges in a vicinity of the selected first edge, selecting a second edge from remaining edges of the plurality of edges after the selecting of the first edge, and collapsing the selected edges such that vertex split information is generated that is based on the collapsing of the selected edges. In some implementations, the method may further include entropy encoding of the vertex split information.

21 Claims, 7 Drawing Sheets

(56) References Cited

OTHER PUBLICATIONS

Maglo, "POMAR:Connpression of progressive oriented meshes accessible randomly" (Year: 2013).*
Caillaud, F. et al.: "Progressive Compression of Arbitrary Textured Meshe" Computer Graphics Forum (Proceedings of Pacific Graphics), vol. 35, No. 7. 2016, 10 pages.
Garland, M. et al.: "Surface Simplification Using Quadric Error Metrics," SIGGRAPH 97, 1997, 8 pages.
Hoppe, H.: "New Quadric Metric for Simplifying Meshes with Appearance Attributes," Proceedings of the conference on Visualization '99: celebrating ten years, San Francisco, California, USA, Oct. 1999, p. 59-66.
Pajarola, R. et al: "Compressed Progressive Meshes," IEEE Trans. Vis. Comput. Graph., 6 (1), 2000, pp. 79-93.
Al-Regib, Ghassan et al., "Bit Allocation for Joint Source and Channel Coding of Progressively Compressed 3-D Models", IEEE Transactions on Circuits and Systems for Video Technology, vol. 15, No. 2, pp. 256-268, Feb. 2005, XP011126455.
International Search Report and Written Opinion for International Application No. PCT/US2019/027037, dated Jun. 28, 2019, 16 pages.
International Search Report and Written Opinion for International Application No. PCT/US2019/027041, dated Jun. 28, 2019, 15 pages.
International Search Report and Written Opinion for International Application No. PCT/US2019/027042, dated Jun. 28, 2019, 15 pages.
Kami, Zachi et al., "Efficient Compression and Rendering of Multi-Resolution Meshes", IEEE Visualization 2002, pp. 347-354, Oct. 2002, XP031173386.
Liu, Xingguo et al., "Progressive Geometry Compression for Meshes", IEEE Computer Graphics and Applications, pp. 408-410, Oct. 3, 2000, XP010523038.
Maglo, Adrien et al., "POMAR: Compression of progressive oriented meshes accessible randomly", Computers and Graphics, vol. 37, No. 6, pp. 743-752, Oct. 2013, XP055596461.
Park, Sung-Bum et al., "Progressive Mesh Compression Using Cosine Index Predictor and 2-Stage Geometry Predictor", IEEE International Conference on Image Processing, vol. 2, pp. 233-236, Sep. 22, 2002, XP010607951.
Hoppe, "Progressive Meshes", Proceedings of the 23rd Annual Conference on Computer Graphics and Interactive Techniques (SIGGRAPH '96), 1996, pp. 99-108.

* cited by examiner

570

```
┌─────────────────────────────────────────────────────────────┐
│ Determine, by an encoder, priority values associated with   │
│ collapse of each edge of a plurality of edges, a priority   │
│ value of an edge determined based on an associated error    │
│ metric value of the edge                                    │
│                          572                                │
└─────────────────────────────────────────────────────────────┘
                              │
                              ▼
┌─────────────────────────────────────────────────────────────┐
│ Select, by the encoder, a first edge from the plurality of  │
│ edges, the first edge selected from the plurality of edges  │
│ based on the first edge having a highest priority value of  │
│ the plurality of the edges 574                              │
└─────────────────────────────────────────────────────────────┘
                              │
                              ▼
┌─────────────────────────────────────────────────────────────┐
│ Determine, by the encoder, adjusted priority values of      │
│ edges in a vicinity of the selected first edge 576          │
└─────────────────────────────────────────────────────────────┘
                              │
                              ▼
┌─────────────────────────────────────────────────────────────┐
│ Select, by the encoder, a second edge from remaining edges  │
│ of the plurality of edges after the selecting of the first  │
│ edge, the second edge selected based on the second edge     │
│ having a highest adjusted priority value 578                │
└─────────────────────────────────────────────────────────────┘
                              │
                              ▼
┌─────────────────────────────────────────────────────────────┐
│ Collapse, by the encoder, the selected edges such that      │
│ vertex split information is generated that is based on the  │
│ collapsing of the selected edges 580                        │
└─────────────────────────────────────────────────────────────┘
```

FIG. 5B

INCREASED DENSITY OF BATCHES FOR IMPROVED PROGRESSIVE MESH COMPRESSION

CROSS REFERENCE TO RELATED APPLICATIONS

This application is related to applications filed under U.S. Pat. No. 15/951,944 and 15/951,969, filed on Apr. 12, 2018, the disclosures of both the applications are incorporated by reference herein in their entirety.

FIELD

This application relates, generally, to mesh compression, and specifically, to progressive mesh compression.

BACKGROUND

Progressive mesh compression (or progressive compression) is the encoding of mesh geometry in stages with each stage generating information related to mesh connectivity, positions, and other attributes. Each successive stage results in a coarser level of detail (LOD) of the model, and the encoding of the next LOD takes advantage of the information already contained in the previous LOD. This is relevant for transmitting high resolution models via the Internet as the user on the receiving end (e.g., a client, a client device, or an application) does not have to wait until the entire model is received from the server. The client can quickly display lower resolution LODs of the model before the information associated with higher resolution LODs is received at the client device.

SUMMARY

In one aspect, a method includes a computer-implemented method of progressive mesh compression. In one example implementation, the method may include determining priority values associated with collapse of each edge of a plurality of edges, a priority value of an edge determined based on an associated error metric value of the edge and selecting a first edge from the plurality of edges, the first edge selected from the plurality of edges based on the first edge having a highest priority value of the plurality of the edges. The method may further include determining adjusted priority values of edges in a vicinity of the selected first edge, selecting a second edge from remaining edges of the plurality of edges after the selecting of the first edge, the second edge selected based on the second edge having a highest adjusted priority value, and collapsing the selected edges such that vertex split information is generated that is based on the collapsing of the selected edges. In some implementations, the method may further include entropy encoding of the vertex split information.

BRIEF DESCRIPTION OF THE DRAWINGS

Example implementations will become more fully understood from the detailed description given herein below and the accompanying drawings, wherein like elements are represented by like reference numerals, which are given by way of illustration only and thus are not limiting of the example implementations and wherein:

FIG. 5B illustrates another flowchart of a method of improving density of batches for improved progressive mesh compression, according to at least one example implementation.

It should be noted that these Figures are intended to illustrate the general characteristics of methods, structure, or materials utilized in certain example implementations and to supplement the written description provided below. These drawings are not, however, to scale and may not precisely reflect the precise structural or performance characteristics of any given implementation, and should not be interpreted as defining or limiting the range of values or properties encompassed by example implementation. The use of similar or identical reference numbers in the various drawings is intended to indicate the presence of a similar or identical element or feature.

DETAILED DESCRIPTION

In one implementation, for example, an encoder may determine priority values associated with collapse of each edge of a plurality of edges. The encoder may determine a priority value of an edge based on an associated error metric value of the edge. The decoder selects an edge (e.g., a first edge) with the highest priority value and determines adjusted priority values of remaining edges based on adjustments to the priority values. The adjustments to the priority values of the remaining edges may provide an opportunity to select edges that may increase the number of edges collapsed in one round (e.g., LOD). The encoder selects another edge (e.g., a second edge) with the highest adjusted priority value. In some implementations, the encoder may repeat this process until no more edges are available for selection (or collapse). The selected edges are referred to as independent set of edges and used for collapse. The selected edges are collapsed such that vertex split information is generated. In some implementations, the generated vertex split information is entropy encoded to achieve better compression rates.

Figure 1B:
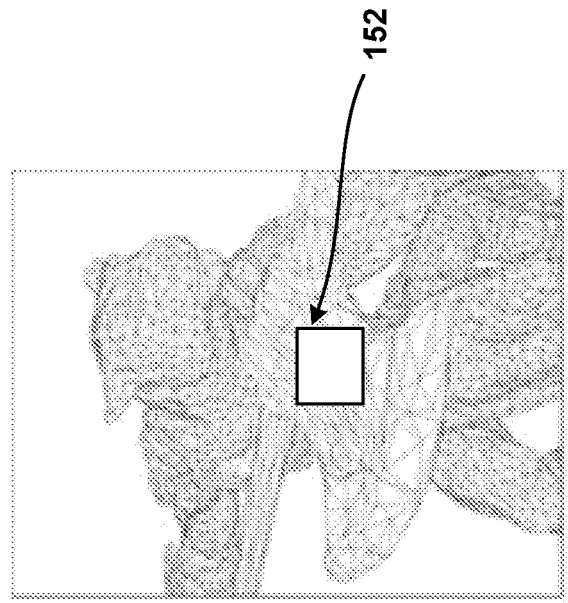
FIG. 1B illustrates a portion of a geometric model (or an image of a geometric model) being compressed using another edge collapse operation, according to at least one example implementation.
Figure 1A:
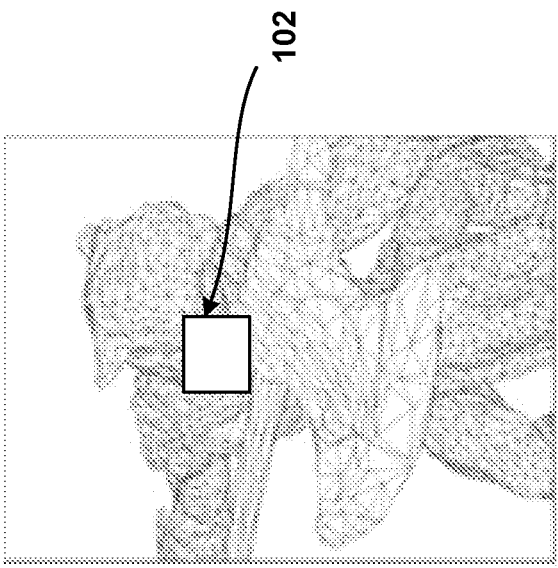
FIG. 1A illustrates a portion of a geometric model (or an image of a geometric model) being compressed using an edge collapse operation, according to at least one example implementation.

FIG. 1A illustrates a portion of a geometric model 100 being compressed using an edge collapse operation, according to at least one example implementation. In FIG. 1A, area 102 of the geometric model 100 represents an area which may be compressed using an improved progressive mesh compression. In one example implementation, the area 102 may be compressed using a full-edge collapse operation (or using a full-edge collapse operator) that is described in detail below in reference to FIG. 2A. During progressive mesh compression, an encoder may generate a plurality of LODs and associated vertex split records. A LOD and associated vertex split records may be generated by collapsing an input mesh with successive batches (e.g. one or more batches) of edge collapse operators until a very coarse mesh is generated or there are no more edges for collapse (e.g., error metric value may be too high for the LOD for edge collapse).

FIG. 1B illustrates a portion of a geometric model 150 being compressed using another edge collapse operation, according to at least one example implementation. In FIG. 1B, area 152 of the geometric model 150 represents an area which may be compressed using an improved progressive mesh compression. In one example implementation, the area 152 may be compressed using a half-edge collapse operation (or using a half-edge collapse operator) that is described in detail below in reference to FIG. 2B.

Figure 2A:
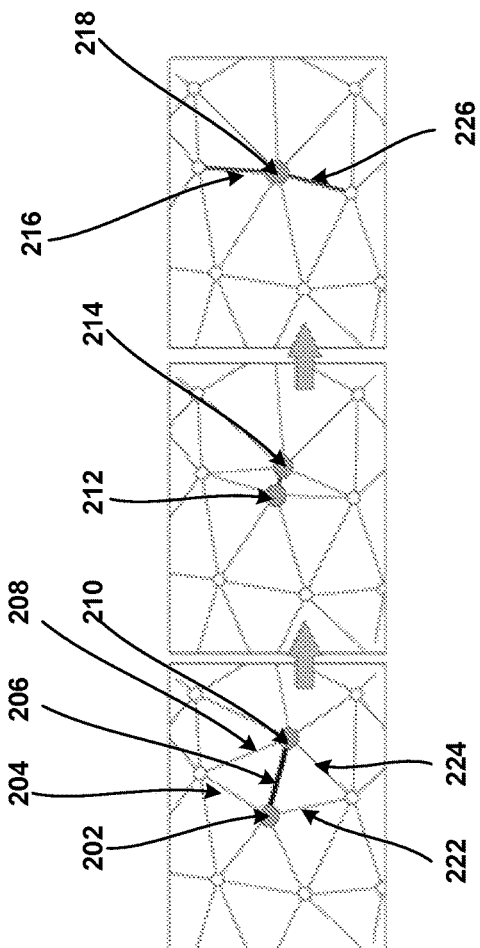
FIG. 2A illustrates a full-edge collapse operation, according to at least one example implementation.

FIG. 2A illustrates a full-edge collapse operation 200, according to at least one example implementation.

In FIG. 2A, an edge 206 connecting vertices 202, 210 may be collapsed via a full-edge collapse operation (e.g., using a full-edge collapse operator). In such a full-edge collapse operation, the two vertices 202, 210 are merged into one vertex (e.g., a merged vertex, a split vertex, etc.) and a new vertex 218 is generated. The location of the new vertex 218 may be determined based on, for example, minimizing an error associated with the collapse of the edge 206 (e.g., minimizing the associated local error).

The full-edge collapse operation requires higher number of bits (for instance, when compared to the half-edge collapse operation described below in reference to FIG. 2B) for encoding the two residuals between the merged vertex 218 and its two ancestors 202, 210 so that a decoder can properly reverse the full-edge collapse operation during decoding. During the full-edge collapse operation, as the edge 206 is being collapsed, the edges 204 and 208 are collapsed into a new edge (e.g., edge 216) and edges 222 and 224 are collapsed into another new edge (e.g., edge 226). Vertices 212 and 214 illustrate the merging of vertices 202 and 204 during transition of the full-edge operation. The collapsing of an edge (e.g., using a full-edge collapse operation) and the merging of the vertices, as described above, may generate a LOD (e.g., lower LOD) and associated vertex split records. The vertex split records are used by the decoder to decode (e.g., re-construct) the vertices and/or the edges that were encoded (e.g., collapsed, merged, etc.) during the full-edge collapse operation.

Figure 2B:
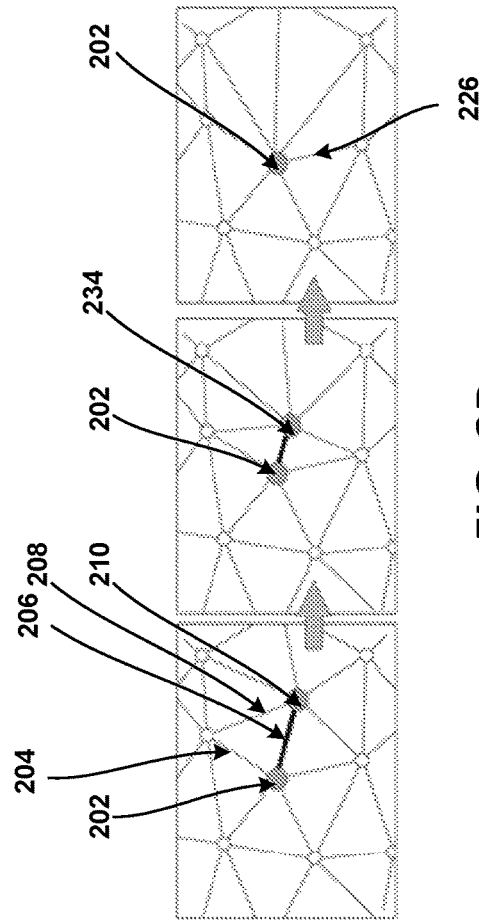
FIG. 2B illustrates a half-edge collapse operation, according to at least one example implementation.

FIG. 2B illustrates a half-edge collapse operation 250, according to at least one example implementation.

In FIG. 2B, the edge 206 connecting vertices 202, 210 may be collapsed via a half-edge collapse operation (e.g., using a half-edge collapse operator). In such a half-edge collapse operation, one of the two vertices (e.g., vertex 210) may be merged into another vertex (e.g., vertex 202), and data is generated so that the decoder may regenerate the vertices or edges during decoding.

The half-edge collapse operation requires a lower number of bits (for instance, when compared to the full-edge collapse operation described above in reference to FIG. 2A) as only one residual associated with the vertex that is merged (e.g., vertex 210) has to be encoded to reverse the half-edge collapse operation during decoding. During the half-edge collapse operation, as the vertex 210 is being merged into vertex 202, the edge 208 is collapsed into the edge 204 and the edge 224 is collapsed into edge 222. Vertex 234 illustrates the merging of the vertex 210 into the vertex 202 during transition of the half-edge collapse operation. The collapsing or merging of edges and/or merging of vertices using half-edge collapse operations, as described above, may generate a LOD (e.g., lower LOD) and associated vertex split records. The vertex split records are used by the decoder to decode (e.g., re-construct) the vertices and/or the edges that were encoded (e.g., collapsed, merged, etc.) during the half-edge collapse operation. Although, the half-edge collapse operation may require lower number of bits (for instance, when compared to full-edge collapse operation) for representing the information that is required for decoding, the distortion rate may be higher (e.g., more distorted lower LODs).

Figure 3:
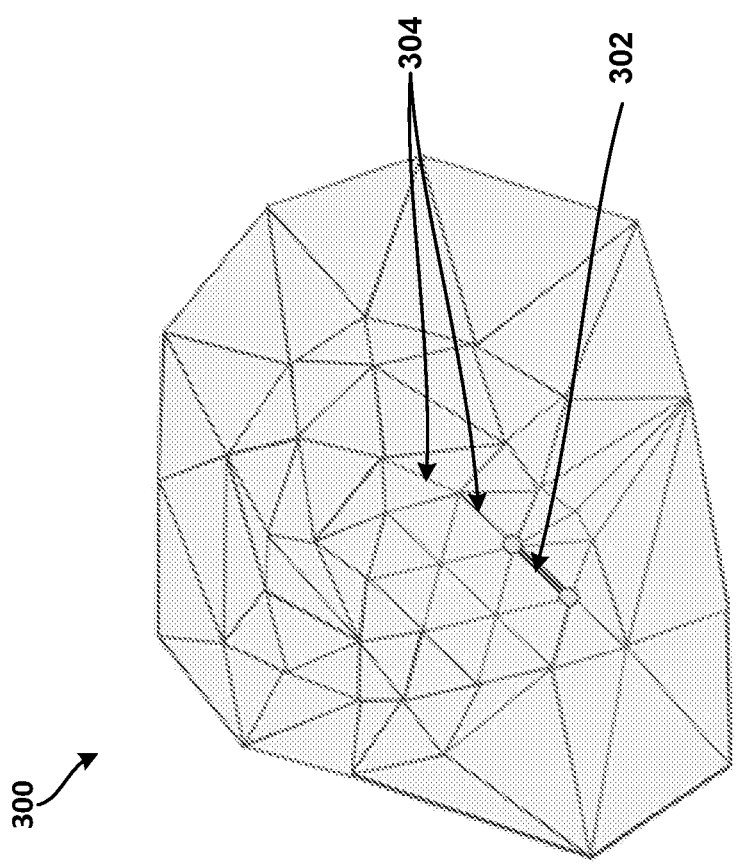
FIG. 3 illustrates an edge selection mechanism, according to at least one example implementation.

FIG. 3 illustrates an edge selection mechanism 300, according to at least one example implementation.

A sequence of levels of detail (LODs) may be created (or generated) during progressive compression by decimating an input mesh with successive batches of edge collapses (for example, using edge collapse operators) until a very coarse mesh is generated (or no more edges are available for collapse as error metric values may be too high for the LOD for edge collapses). A batch of edge collapses may include collapsing a subset of edges of a current mesh.

In progressive mesh compression, each edge collapse may be associated with an error (e.g., an error metric value) when the edge is collapsed. The error metric value reflects (e.g., represents) the affect of the edge collapse on the quality of the mesh. In other words, the error metric value associated with an edge collapse indicates how the quality of the mesh may be (e.g., negatively) impacted by the collapse of the edge. Therefore, to avoid collapsing edges that are too expensive (e.g., major affect on the quality of the mesh, etc.), the edges may be sorted (e.g., prioritized) based on their associated error metric values prior to being selected for collapse (or prior to being added to an independent set of edges). For example, the edges may be sorted based on their error metric values and the edge with the lowest associated error metric value queued first. In one example implementation, as the edges of the input mesh are being selected, the edges that are not being blocked are added to form (or create) an independent set of edges (e.g., first independent set of edges) and edges in the vicinity of an edge that may be blocked are not considered for collapse in the current round. The adding of edges to the independent set of edges may continue until all edges are blocked or error metric values are above a corresponding threshold.

For example, in some implementations, as shown in FIG. 3, an edge 302 may be collapsed without interference from another edge. However, the edges 304 which are in the vicinity of the edge 302 may be blocked from being collapsed by the edge 302. The edges 304 that are being blocked (e.g., from being collapsed) by another edge (e.g., edge 302) are generally referred to as blocked edges and cannot be collapsed in the current round (e.g., while generating the current LOD). That is, the edges 304 cannot be collapsed in the same round as the edge 302. However, one or more of the edges 304 may be collapsed during a later round of edge collapses when generating another LOD.

Figure 4B:
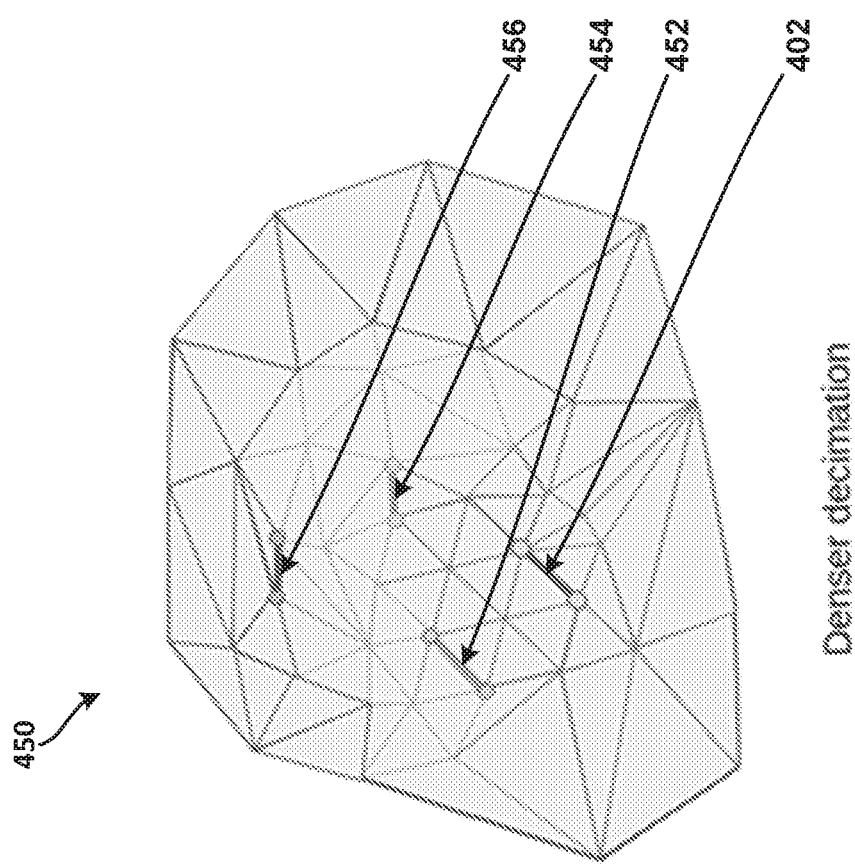
FIG. 4B illustrates a denser decimation mechanism for improved progressive compression, according to at least one example implementation.
Figure 4A:
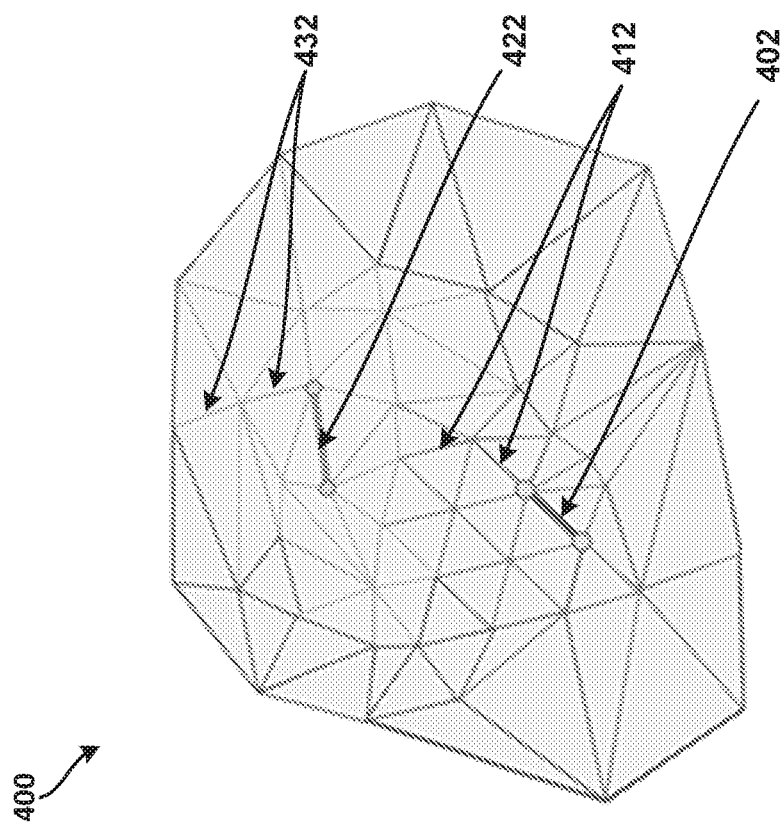
FIG. 4A illustrates a decimation mechanism for progressive compression, according to at least one example implementation.

FIG. 4A illustrates a decimation mechanism 400, according to at least one example implementation.

As illustrated in FIG. 4A, in addition to edge 402 (which may be similar to the edge 302 of FIG. 3), edge 422 may be collapsed without interference from other edges (e.g., edges 402, 412, 432). However, the edges 432 which are in the vicinity of the edge 422 may be blocked from being collapsed by the edge 422. The edges 432 that are blocked from being collapsed by another edge (e.g., edge 422) may be referred to as blocked edges and cannot be collapsed in the current round (e.g., while generating the current LOD). That is, the edges 432 cannot be collapsed in the same round as the edge 422. However, one or more of the edges 432 may be collapsed during a later round of edge collapses to generate another LOD.

In one implementation, for example, the edges 402 and 422 may be collapsed using full-edge collapse operations (e.g., described above in detail in reference to FIG. 2A) or half-edge collapse operations (e.g., described above in detail in reference to FIG. 2B). In another implementation, for example, the edges 402 and 422 may be collapsed using mid-point collapse operations. In some other implementations, one LOD may be generated using one type of edge-collapse operations (e.g., half-edge or full-edge collapse operations) and/or the following LOD may be generated using another type of edge-collapse operations (e.g. full-edge or half-edge collapse operators) to achieve a balance between quality (e.g., distortion) and cost (e.g., bit rate or bits per vertex). In some implementation, a mid-point collapse may be used for collapsing edges.

As a batch of edges is collapsed, a lower LOD (e.g., lower resolution or coarser LOD) is generated along with additional information (e.g., vertex split information) that allows the decoder to recover the previous LOD (e.g. higher resolution LOD). In some implementations, the information generated during the generating of a LOD may include, for example, a header with initial information for the decoder (e.g., indicating whether full-edge or half-edge operations were performed); information on how the encoded vertices are to be split into edges at the decoder; information how the vertices (e.g., split vertices) are connected to their surrounding vertices (neighbors of the split vertex); information necessary for the recovery of positions of the split vertices; and/or texture coordinates or any other optional attributes. However, the number of edges that can be collapsed in one round (e.g., density of edges) may vary as the order of the edges that is provided by the error metric values may not provide a good (or efficient) packing of the edges. Therefore, it is desired to have a denser packing (or increase packing) of edges such that more edges may be collapsed per round (e.g., for each LOD) to achieve better compression rates.

FIG. 4B illustrates a denser decimation mechanism 450 for improved progressive compression, according to at least one example implementation.

The present disclosure discloses a mechanism to increase the density of the batches, for example, the number of edges collapsed in one round (e.g., number of edges added to an independent set of edges for collapse, density of edges, etc.) which may affect the encoding of information (e.g., vertex split information, etc.) associated with progressive mesh compression.

For example, in some implementations, better compression of information related to the encoding of vertices (e.g., vertices that need to be split into edges during decoding) may be achieved. The better compression of information may be possible because entropy encoding may improve due to denser packing of edges. In some other implementations, the increased number of edges collapsed (or decimated) in each round may allow for more symbols to be encoded in each round which could lead to better compression rates (e.g., encoding of information related to how the vertices (e.g., split vertices) are connected to their surrounding vertices (neighbors of the split vertex). In some more implementations, information necessary for the recovery of positions of the split vertices and/or texture coordinates or any other optional attributes may be compressed better.

Therefore, based on the above, the entire progressive mesh compression process may require less rounds as more edges may be collapsed per round and therefore requiring less headers that need to be encoded.

For example, in shown in FIG. 4B, edges 402, 452, 454, and 456 may be collapsed by using adjusted priority values to determine the independent set of edges for collapse. In comparison, only edges 402 and 422 were eligible for collapse strictly based on priority values. This is possible as the proposed mechanism may alter the order (e.g., priority values) of edges slightly so that edges that are closer to other edges that have been already chosen (e.g., selected) are favored. However, in a scenario, with two edges that are being compared have the same error metric values (e.g., based on a comparison in a priority queue), the edges that block less number of edges that are not blocked yet are favored and thus leaving more space for other edges. This approach tends to pack edges closer together and more likely to obtain a denser packing.

Figure 5A:
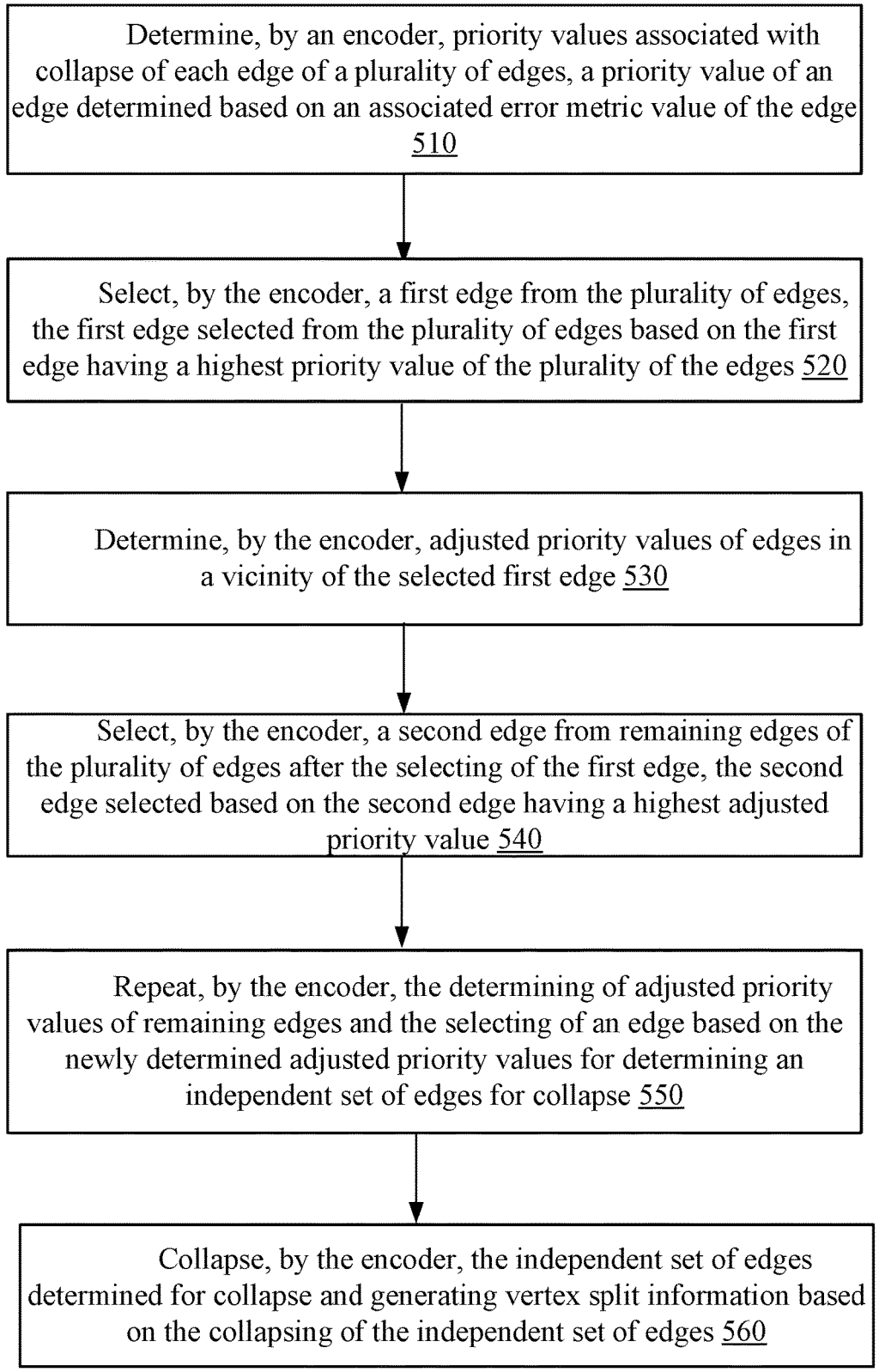
FIG. 5A illustrates a flowchart of a method of improving density of batches for improved progressive mesh compression, according to at least one example implementation.

FIG. 5A illustrates a flowchart 500 of a method of increasing density of batches for improved progressive mesh compression. In one implementation, for example, the method may be performed by an encoder and may be based on increasing the number of edges collapsed in one round to improve progressive mesh compression.

At block 510, an encoder may determine priority values associated with collapse of each edge of a plurality of edges, a priority value of an edge determined based on an associated error metric value of the edge. For example, in one implementation, the encoder may determine priority values associated with collapse of each edge of a plurality of edges (e.g., edges shown in FIG. 4B). The priority value of an edge may be determined from the error metric value associated with the collapse of the edge, for example, based on priority queues. Once the encoder determines the error metric values of the edges, the encoder may sort the edges, for instance, using priority queues, and the edge with the lowest error metric value queued first. In some implementations, a lowest error metric value may correspond to a highest priority value.

At block 520, the encoder may select a first edge from the plurality of edges, the first edge selected from the plurality of edges based on the first edge having a highest priority value of the plurality of the edges. For example, in one implementation, the encoder may select a first edge (e.g., edge 402) based on the edge 402 having the highest priority value. In other words, the edge 402 may be selected because the edge 402 has the lowest error metric value associated with collapse of the edge 402.

At block 530, the encoder may determine adjusted priority values of edges in a vicinity of the selected first edge. For example, in one implementation, the encoder, upon selection of the first edge (e.g., edge 402), may determine adjusted priority values of edges in a vicinity of the edge 402. In some implementations, two edges may be considered to be in the vicinity of each other if the two edges have one or more edges in common that are blocked or the edges are in a same area. In some implementations, the encoder may determine adjusted priority values of edges (e.g., edges 452, 454, and/or 456) in the vicinity of the first selected edge (e.g., edge 402). The adjusted priority value of an edge, for instance, may be determined based on an allowed variance to the priority value associated with the edge, an actual number of edges blocked by the edge, and a maximum number of edges that could be blocked by the edge.

In some implementations, the adjusted priority values may be determined by improving the priority values associated with edges in the vicinity (e.g., neighborhood) of an already selected edge. The adjustment to the priority value of an edge may be up to X %. The maximum improvement may be achieved if no new edges are being blocked by the given edge. For example, the adjusted priority value (D'$_e$) of an edge e may be determined as shown below where D$_e$ is the priority value (may also be referred to as initial or original priority value) associated with an edge e, K is a maximum number of edges that edge e can block, and k is the actual number of edges that would be blocked if edge e is selected. For instance, the adjusted priority value of an edge e may be determined as show below:

$$D'_e = D_e * (1 - X\%(1 - k/K))$$

In some implementations, the adjusted priority values provide an opportunity to determine if there are any other edges that may be considered as better candidates for collapsing to achieve a denser packing of edges in the current round.

At block 540, the encoder may select a second edge from remaining edges of the plurality of edges after the selecting of the first edge, the second edge selected based on the second edge having a highest adjusted priority value. For example, in one implementation, the encoder may select edge 452 as the next edge for collapse. The edge 452 may be selected based on the edge 452 having the highest adjusted priority value. In some implementations, the second edge 452 may be a part of independent set of edges (along with the edge 402) as the second edge 452 does not block the collapse of the first edge (e.g., edge 402).

At block 550, the encoder may repeat the determining of adjusted priority values of remaining edges and the selecting of an edge based on newly determined adjusted priority values for determining an independent set of edges for collapse. For example, in one implementation, the encoder may repeat the process of determining adjusted priority values (adjusted priority values determined from the priority values determined at block 510) and selecting an edge based on the determined adjusted priority values. That is, upon selecting the edge 452, the encoder may determine adjusted priority values of edges in the vicinity of the edge 452 and select edge 454 based on the edge 454 having the highest adjusted priority value. Following the selection of the edge 454, the encoder may determine adjusted priority values of edges in the vicinity of the edge 454 and select edge 456 based on the edge 456 having the highest adjusted priority value, and so on. The encoder may continue this process until no more edges are available. The edges that are selected create or form an independent set of edges which the encoder may used for collapsing.

At block 560, the encoder may collapse the independent set of edges determined for collapse and generate vertex split information based on the collapsing of the independent set of edges. In one implementation, for example, edges 402, 452, 454, 456, etc., which are included in the independent set of edges may be collapsed to generate vertex split information (or the encoder may collapse the independent set of edges determined for collapse such that vertex split information is generated). In some implementations, the vertex split information may be entropy encoded to achieve better compression rates. In some other implementations, the vertex split information may be transmitted from the encoder to a decoder in response to a message from the decoder. The decoder used the vertex split information to de-construct the mesh. In other words, the vertex split information may be entropy encoded, stored, and transmitted to a decoder in response to a request from the decoder.

FIG. 5B illustrates a flowchart 570 of a method of increasing density of batches for improved progressive mesh compression. In one implementation, for example, the method may be performed by an encoder and may be based on increasing the number of edges collapsed in one round to improve progressive mesh compression.

The operations at blocks 572, 574, 576, and 578 may be similar to the operations at blocks 510, 520, 530, and 540 (of FIG. 5A), respectively.

At block 580, the encoder may collapse the selected edges such that vertex split information is generated that is based on the collapsing of the selected edges. In one implementation, for example, edges 402 and 452 (or 402, 452, 454, 456, etc.) which are selected may be collapsed to generate vertex split information. In some implementations, the vertex split information may be entropy encoded to achieve better compression rates. In some other implementations, the vertex split information may be transmitted from the encoder to a decoder in response to a message from the decoder. The decoder used the vertex split information to de-construct the mesh. In other words, the vertex split information may be entropy encoded, stored, and transmitted to a decoder in response to a request from the decoder.

In one aspect, a method includes a computer-implemented method of progressive mesh compression. In one example implementation, the method may include determining priority values associated with collapse of each edge of a plurality of edges, a priority value of an edge determined based on an associated error metric value of the edge and selecting a first edge from the plurality of edges, the first edge selected from the plurality of edges based on the first edge having a highest priority value of the plurality of the edges. The method may further include determining adjusted priority values of edges in a vicinity of the selected first edge, selecting a second edge from remaining edges of the plurality of edges after the selecting of the first edge, the second edge selected based on the second edge having a highest adjusted priority value, repeating the determining of adjusted priority values of remaining edges and the selecting of an edge based on newly determined adjusted priority values for determining an independent set of edges for collapse, and collapsing the independent set of edges determined for collapse and generating vertex split information based on the collapsing of the independent set of edges. In some implementations, the method may further include entropy encoding the vertex split information.

In another aspect, an encoder includes a processor and a memory. The memory may include instructions configured to cause the processor to determine priority values associated with collapse of each edge of a plurality of edges, a priority value of an edge determined based on an associated error metric value of the edge and select a first edge from the plurality of edges, the first edge selected from the plurality of edges based on the first edge having a highest priority value of the plurality of the edges. The memory may further include instructions to determine adjusted priority values of edges in a vicinity of the selected first edge, select a second edge from remaining edges of the plurality of edges after the selecting of the first edge, the second edge selected based on the second edge having a highest adjusted priority value, repeat the determining of adjusted priority values of remaining edges and the selecting of an edge based on newly determined adjusted priority values for determining an independent set of edges for collapse, and collapse the independent set of edges determined for collapse and generate vertex split information based on the collapsing of the independent set of edges. In some implementations, the method may further include entropy encoding the vertex split information.

In a further additional aspect, a non-transitory computer-readable storage medium having stored thereon computer executable program code which, when executed on a computer system, causes the computer system to perform a method of progressive mesh compression. The method may include determining priority values associated with collapse of each edge of a plurality of edges, a priority value of an edge determined based on an associated error metric value of the edge and selecting a first edge from the plurality of edges, the first edge selected from the plurality of edges based on the first edge having a highest priority value of the plurality of the edges. The computer-readable storage medium may further comprise code for determining adjusted priority values of edges in a vicinity of the selected first edge, selecting a second edge from remaining edges of the plurality of edges after the selecting of the first edge, the second edge selected based on the second edge having a highest adjusted priority value, repeating the determining of adjusted priority values of remaining edges and the selecting of an edge based on newly determined adjusted priority values for determining an independent set of edges for collapse, and collapsing the independent set of edges determined for collapse and generating vertex split information based on the collapsing of the independent set of edges. In some implementations, the method may further include entropy encoding the vertex split information.

Thus, the encoder increased the density of batches to improve progressive mesh compression and/or achieve better compression rates.

Figure 6:
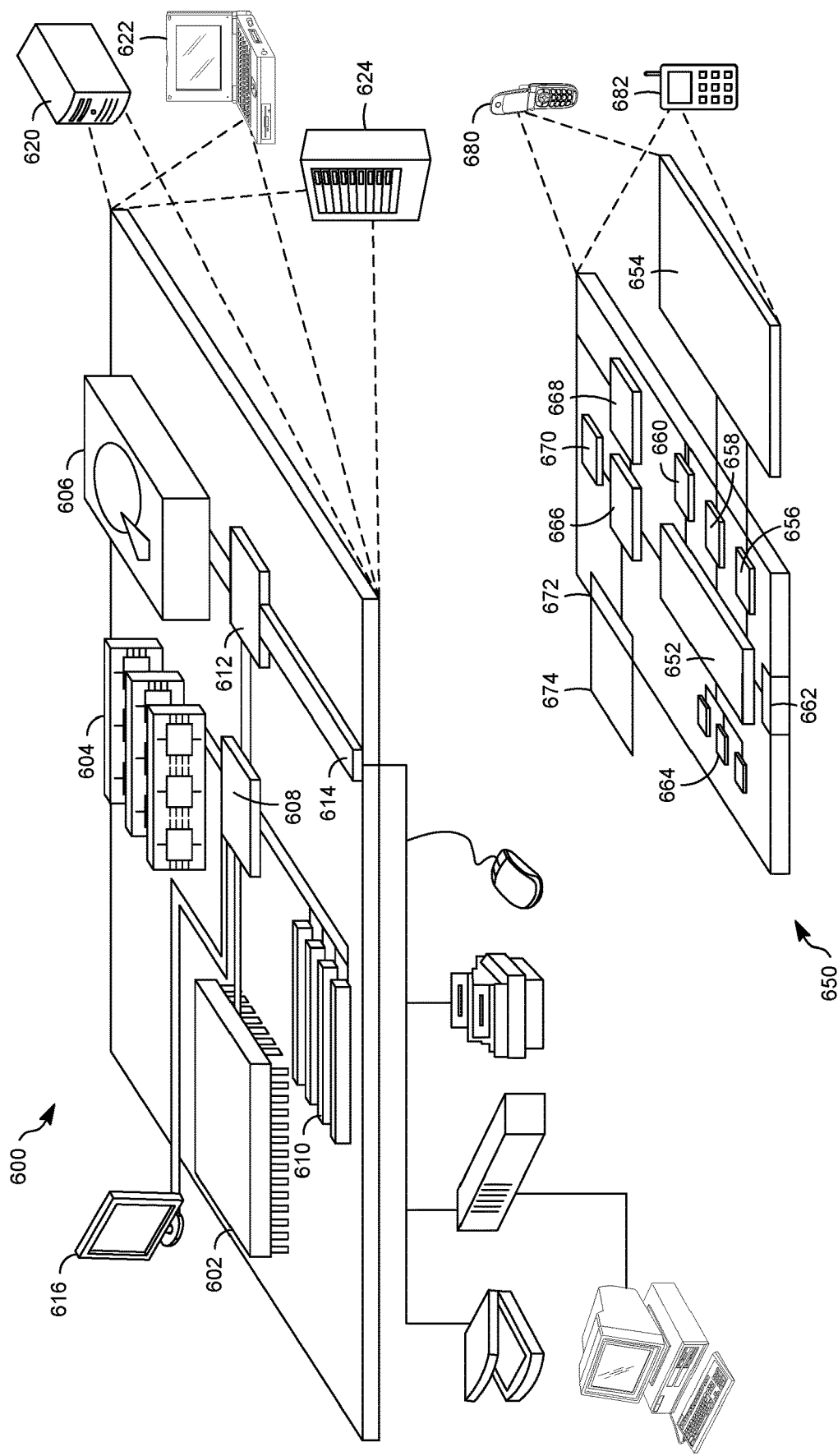
FIG. 6 illustrates an example of a computer device and a mobile computer device according to at least one example implementation.

FIG. 6 shows an example of a computer device 600 and a mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input or output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. The computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input or output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input or output device such as a display 654, a communication interface 666, and a transceiver 668, among other components. The device 650 may also be provided with a storage device, such as a microdrive or other device, to provide additional storage. Each of the components 650, 652, 564, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions, acts, or computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an, and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions or acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example implementations and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative implementations, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example implementations are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example implementations not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or implementations herein disclosed irrespective of whether or not that particular combination has been specifically enumerated in the accompanying claims at this time.

While example implementations may include various modifications and alternative forms, implementations thereof are shown by way of example in the drawings and will herein be described in detail. It should be understood, however, that there is no intent to limit example implementations to the particular forms disclosed, but on the contrary, example implementations are to cover all modifications, equivalents, and alternatives falling within the scope of the claims. Like numbers refer to like elements throughout the description of the figures.

What is claimed is:

1. A computer-implemented method of progressive mesh compression, comprising:
    determining, by an encoder, priority values associated with collapse of each edge of a plurality of edges, a priority value of an edge determined based on an associated error metric value of the edge;
    selecting, by the encoder, a first edge from the plurality of edges, the first edge selected from the plurality of edges based on the first edge having a highest priority value of the plurality of the edges;
    determining, by the encoder, adjusted priority values of edges in a vicinity of the selected first edge, the adjusted priority values used to alter an order of the edges, the order of the edges being based on the priority values;
    selecting, by the encoder, a second edge from remaining edges of the plurality of edges after the selecting of the first edge, the second edge selected based on the second edge having a highest adjusted priority value; and
    collapsing, by the encoder, the selected edges such that vertex split information is generated that is based on the collapsing of the selected edges.

2. The method of claim 1, further comprising:
    entropy encoding, by the encoder, the vertex split information.

3. The method of claim 1, further comprising:
transmitting, from the encoder, the generated split vertex information to a decoder in response to a message received from the decoder.

4. The method of claim 1, wherein the adjusted priority value associated with an edge is determined based on an allowed variance to the priority value associated with the edge, an actual number of edges blocked by the edge, and a maximum number of edges that could be blocked by the edge.

5. The method of claim 1, wherein an edge is added to the independent set of edges when a collapse of the edge is not being blocked by collapse of other edges that are already included in the independent set of edges.

6. The method of claim 1, wherein the collapse of an edge further comprises:
collapsing the edge that connects two vertices using a full-edge or a half-edge collapse operation.

7. The method of claim 1, wherein a highest priority value corresponds to a lowest error metric value.

8. The method of claim 1, wherein the adjusted priority values favor edges that are closer to the selected first edge.

9. An encoder, comprising:
a processor; and
a memory, the memory including instructions configured to cause the processor to:
determine priority values associated with collapse of each edge of a plurality of edges, a priority value of an edge determined based on an associated error metric value of the edge;
select a first edge from the plurality of edges, the first edge selected from the plurality of edges based on the first edge having a highest priority value of the plurality of the edges;
determine adjusted priority values of edges in a vicinity of the selected first edge, the adjusted priority values used to alter an order of the edges, the order of the edges being based on the priority values;
select a second edge from remaining edges of the plurality of edges after the selecting of the first edge, the second edge selected based on the second edge having a highest adjusted priority value; and
collapse the selected edges determined such that vertex split information is generated that is based on the collapsing of the selected edges.

10. The encoder of claim 9, further comprising instructions to cause the processor to:
entropy encode the vertex split information.

11. The encoder of claim 9, further comprising instructions to cause the processor to:
transmit the generated split vertex information to a decoder in response to a message received from the decoder.

12. The encoder of claim 9, wherein the adjusted priority value associated with an edge is determined based on an allowed variance to the priority value associated with the edge, an actual number of edges blocked by the edge, and a maximum number of edges that could be blocked by the edge.

13. The encoder of claim 9, wherein an edge is added to the independent set of edges when a collapse of the edge is not being blocked by collapse of other edges that are already included in the independent set of edges.

14. The encoder of claim 9, wherein a highest priority value corresponds to a lowest error metric value.

15. A non-transitory computer-readable storage medium having stored thereon computer executable program code which, when executed on a computer system, causes the computer system to perform a method of progressive mesh compression, comprising:
determining, by an encoder, priority values associated with collapse of each edge of a plurality of edges, a priority value of an edge determined based on an associated error metric value of the edge;
selecting, by the encoder, a first edge from the plurality of edges, the first edge selected from the plurality of edges based on the first edge having a highest priority value of the plurality of the edges;
determining, by the encoder, adjusted priority values of edges in a vicinity of the selected first edge, the adjusted priority values used to alter an order of the edges, the order of the edges being based on the priority values;
selecting, by the encoder, a second edge from remaining edges of the plurality of edges after the selecting of the first edge, the second edge selected based on the second edge having a highest adjusted priority value; and
collapsing, by the encoder, the selected edges such that vertex split information is generated that is based on the collapsing of the selected edges.

16. The computer-readable storage medium of claim 15, further comprising code for:
entropy encoding, by the encoder, the vertex split information.

17. The computer-readable storage medium of claim 15, further comprising code for:
transmitting, from the encoder, the generated split vertex information to a decoder in response to a message received from the decoder.

18. The computer-readable storage medium of claim 15, wherein the adjusted priority value associated with an edge is determined based on an allowed variance to the priority value associated with the edge, an actual number of edges blocked by the edge, and a maximum number of edges that could be blocked by the edge.

19. The computer-readable storage medium of claim 15, wherein an edge is added to the independent set of edges when a collapse of the edge is not being blocked by collapse of other edges that are already included in the independent set of edges.

20. The computer-readable storage medium of claim 15, further comprising code for:
collapsing the edge that connects two vertices using a full-edge or a half-edge collapse operation.

21. The computer-readable storage medium of claim 15, wherein a highest priority value corresponds to a lowest error metric value.

* * * * *